US005253926A

United States Patent [19]

Foppe

[11] Patent Number: 5,253,926

[45] Date of Patent: Oct. 19, 1993

[54] PROCESS FOR MAKING GENERAL USE OF THE EARTH'S HEAT AND OBTAINING MINERALS IN THE ZONE OF WEAKNESS (AT DEPTHS OF 13-30 KM)

[75] Inventor: Werner Foppe, Geilenkirchen, Fed. Rep. of Germany

[73] Assignee: Compisa AG, Switzerland

[21] Appl. No.: 721,635

[22] PCT Filed: Sep. 10, 1990

[86] PCT No.: PCT/CH90/00212

§ 371 Date: Jul. 11, 1991

§ 102(e) Date: Jul. 11, 1991

[87] PCT Pub. No.: WO91/03690

PCT Pub. Date: Mar. 21, 1991

[30] Foreign Application Priority Data

Sep. 10, 1989 [DE] Fed. Rep. of Germany ....... 3930232

[51] Int. Cl.[5] .............................................. E21C 37/12

[52] U.S. Cl. .................................... 299/16; 60/641.2; 165/45; 766/271; 766/302

[58] Field of Search ...................... 299/4, 16; 166/271, 166/302; 165/45; 60/641.1, 641.2, 641.3

[56] References Cited

U.S. PATENT DOCUMENTS

| | | | |
|---|---|---|---|
| 4,137,719 | 2/1979 | Rex | 60/641.2 |
| 4,491,367 | 1/1985 | Tuval et al. | 60/641.2 X |
| 4,991,998 | 2/1991 | Kamino et al. | 165/45 X |

FOREIGN PATENT DOCUMENTS

| | | |
|---|---|---|
| 3000836 | 7/1980 | Fed. Rep. of Germany . |
| 2944731 | 5/1981 | Fed. Rep. of Germany . |
| 2554101 | 1/1986 | Fed. Rep. of Germany . |
| 3627680 | 2/1988 | Fed. Rep. of Germany . |
| 3801933 | 8/1989 | Fed. Rep. of Germany . |
| 8800013 | 1/1988 | World Int. Prop. O. . |

*Primary Examiner*—David J. Bagnell
*Attorney, Agent, or Firm*—Speckman, Pauley & Fejer

[57] ABSTRACT

The hot-weak-rock process for overcoming the technical limitation inherent to the Hot-Dry-Rock Process, of not being able to overcome the shear strength of the rock beyond a certain depth in order to create heating surfaces through HYDRAFRAC. The hot-weak-rock process creates a heating zone in an area of the continental lithosphere in which the shear strength of the hot rock suddenly decreases with increasing overburden and the HYDRFRAC necessary to create heating surfaces is effectuated under the hydrostatic pressure of a water column in a correspondingly deep and lined boring. A technically easily generated additional pressure component is applied to the water column in the boring to create the initial cracks in the lower, unlined section of the boring.

17 Claims, No Drawings

PROCESS FOR MAKING GENERAL USE OF THE EARTH'S HEAT AND OBTAINING MINERALS IN THE ZONE OF WEAKNESS (AT DEPTHS OF 13–30 KM)

BACKGROUND OF THE INVENTION

1. Field of the Invention

This invention relates to a process for the recovery of geothermal energy and mineral resources in the earth's zone of weakness in which large fractured heating zones in hot rock in the deep zone of the continental lithosphere are created by hydrostatic pressure at the bottom of a water column in a lined boring.

2. Description of Prior Art

The so-called Hot-Dry-Rock Process, developed in the 1960s by scientists at the Los Alamos laboratories in New Mexico, U.S.A. to create large heating surfaces in hot, dry, crystalline rock formations for the recovery of geothermal heat energy is known. The term "Hot-Dry-Rock Process" pertains to the goals of its inventors, namely, to create artificial, intercommunicating fracture zones in hot, dry rock formations in which no natural influx of surface or well water is available, in order to recover geothermal heat at locations where anomalies in the Earth's crust occur, but where no natural steam recovery is possible, such as in the traditional geothermally active areas of the Earth.

The Hot-Dry-Rock Process is based on the HYDRAFRAC Process, which has been used in the oil industry for about 30 years, to reactivate oil or natural gas wells which are drying up. In this Hot-Dry-Rock Process, the lower section of the boring, at which level a splitting of the rock formation is desired, is sealed off and subjected to high hydrostatic pressures which break up the surrounding rock by the HYDRAFRAC effect. The water pressure has to be clearly above the shear strength of the rock in order to form cracks with large heating volumes in the rock.

This process has been tested to depths up to 3000 meters in Fenton Hills, near Los Alamos, U.S.A. A further test at 4000 meters failed after a short initial success, due to failure of the pressure unit under the high applied hydrostatic pressure in the end section of the boring. The shear strength of the rock increases with increasing overburden. Thus, the Hot-Dry-Rock Process has limited applicability at depths where the shear strength of the rock is higher than the technically achievable pressures in the boring section sealed off by the so-called "packer." As has been observed in measurements in deep borings and in seismic studies, strong deviations from a generally linear increase in shear strength of the rock occur with increasing overburden. In certain strata, the increase in shear strength is overproportional, reaching peaks of 2000 bars at depths of 3000 meters. Such unusually high increases further limit the range of applicability of the Hot-Dry-Rock Process. The most recent geological findings, seismic studies, and the results of the so-called Kola deep well on the Soviet Kola Peninsula, where a depth of 13,600 meters was reached after 17 years of drilling activity, prove that the shear strength of the rock forming the continental crust increases, with exception of a few local increases in certain formations, more or less linearly with overburden to a depth of about 13 kilometers. After 13 kilometers and up to a depth of about 30 kilometers, the rate of increase with increasing overburden then suddenly drops off. This behavior in crystalline rock is explained by the escape of crystalline water under the local temperature and pressure conditions. This initiates a natural Micro-Frac mechanism which fractures the previously compact rock and results in a strong decrease of the shear strength of the rock formation.

This finely fractured zone in the continental plates of the Earth's crust, with a reduced shear strength, is known in technical circles as the ZONE OF WEAKNESS. Temperatures in the upper portions of this zone reach about 500° C. The temperature at depths of about 30 kilometers can be expected to be as high as 1000° C.

SUMMARY OF THE INVENTION

It is an object of this invention to provide a process for the efficient use of geothermal energy (superheated water at about 500° C.) in large volumes, as well as for the recovery of mineral resources in the ZONE OF WEAKNESS. The process must have low costs at any desired geographic location.

This object is achieved by a process for the recovery of geothermal energy and mineral resources in the ZONE OF WEAKNESS in accordance with one embodiment of this invention, wherein the HYDRAFRAC effect needed to create sufficiently large fractured heating zones in the hot rock in the deep zone of the continental lithosphere lying between 13 and 30 kilometers and in which the shear strength of the rock suddenly decreases in relation to the overburden is generated by the hydrostatic pressures at the bottom of a water column in a lined boring and by the supply of the additional pressure by pumps at the surface through the boring which acts as a cold water pressure shaft. The supplied water is returned to the surface through at least one other shaft located at a given distance from the first after extracting heat from the rock. The collected heat as well as the dissolved mineral fractions in the water are recovered at the surface.

The technical problem of creating large heating surfaces at great depths is solved, where the ZONE OF WEAKNESS can be reached by large diameter borings, using the fusion drilling technique according to German Patent DE-PS 25 54 101 C2 and the international patent PCT/DE88/00013. The borings are lined along their entire length except for the last 2 kilometers, where splitting of the rock through HYDRAFRAC is to be performed. The splitting of the rock in the ZONE OF WEAKNESS, already pre-fracted by geological processes, occurs under the pressure of the cold water column. The diameter of the borings, which can only be achieved by the fusion drilling process mentioned above, has an important, twofold function:

1. There is a defined relationship between the diameter of the boring and the length of the cracks created in the hot rock by HYDRAFRAC, and thus the size of the developed geothermal reservoir. Current findings indicate a crack propagation distance corresponding to about 600 times the diameter of the boring.

2. The diameter of the boring determines the flow capacity through it and its holding capacity as a short-term storage and buffer area, to compensate for the peaks in energy demand.

DESCRIPTION OF PREFERRED EMBODIMENTS

The process in accordance with this invention is named the "hot-weak-rock process", analogous to the term "Hot-Dry-Rock" Process. A first boring, created by the fusion drilling process according to German Patent DE-PS 25 54 101 C2 and the international patent PCT/DE88/00013, serves as a cold water shaft. This boring, with a preferred diameter of 1 to 2 meters, descends to a depth of about 13 to 15 kilometers, that is, into the so-called ZONE OF WEAKNESS. Further borings having a diameter of about 1 meter are made around the periphery of the centralized first boring, at a distance of about 100 meters from it. These shafts are bored at a slight angle, so that their lower section lies at about 1000 meters from the centralized, cold water shaft. This provides a larger heating area. A deflection of the boring of the order of 1000 meters at a depth of 15 kilometers can be achieved without any problem. In the Kola deep well mentioned above, which was created using a rotary boring technique and thus had limited possibilities for trajectory correction, a deviation of 840 meters resulted, despite steps taken to keep the deflection to a minimum.

The cracks produced by HYDRAFRAC, with lengths of about 600 times the diameter of the centralized first boring, cover the area between the various borings. All borings are lined with steel pressure sleeves to a depth of 13 kilometers, that is, to 2 kilometers less than the total length of the boring. Such linings are known in drilling technology. At least the upper half of the lined borings, which serve as conveyance shafts, is insulated. The remaining lower, unlined, 2 kilometers of the borings provide access to the rock for the creation of large heating surfaces by HYDRAFRAC in the hot rock formations. The peripheral, return shafts are connected to the centralized, cold water pressure shaft over a heat exchanger installation at the surface. The heat exchanger facility is designed to use the geothermally superheated water at temperatures over 300° C., first for the production of process steam. The second use is for the production of electrical energy, the demand for which would be reduced: the relatively large energy requirements for heat and hot water as seen in the current commercial, agricultural and domestic demand, would be covered directly by the steam supply.

The process is started up by first closing all valves to the heat exchanger facility and by simultaneously flooding all shafts with cold water. The rock lying at depths corresponding to the ZONE OF WEAKNESS has a shear strength which is so strongly reduced through natural Micro-Frac in this zone that the hydrostatic pressure generated by the water column in the centralized first boring is almost sufficient to produce the HYDRAFRAC effect at the lower end of the boring. Only slight additional pressures are necessary to cause splitting of the rock in order to form large heating surfaces, and to hold the cracks open. HYDRAFRAC, which is initiated at pressures between 1500 and 1700 bar, can be induced by a cold water column of 15 kilometer height supplemented by a 200 bar pump. The HYDRAFRAC effect is sustained until a sufficiently large reservoir is created and a connection by crack formation is established between the various shafts. At this point, all cold water supplies, with exception of the centralized, cold water pressure shaft, are terminated, and the valves to the heat exchanger are opened. The geothermally superheated water in the peripheral shafts rises under the continued pressure applied through the centralized, first shaft, pushing the colder water, left in the shafts from the HYDRAFRAC stage, out through the heat exchanger facility and back to the pumps of the centralized, first shaft until the nominal energy level is reached in the peripheral shafts. This begins the energy recovery stage. The water must not be allowed to convert to its vapor phase during this first stage, to avoid the formation of deposits in the shafts. The formation of ion sediments is further prevented in the geothermally superheated water by appropriate electrical precipitators in the closed circulation system. Special aggregates are used to extract and recover valuable gases or minerals, such as noble metals, from the geothermal water. In strongly enriched geothermal water, mineral extraction can even supplant the energy production function of the process. Thus, a single plant could take on the twofold function of power production and mineral recovery.

The process in accordance with this invention, characterized by the use of the hydrostatic pressure generated by the water column in the boring, can also extend the effective radius of the known Hot-Dry-Rock Process by the supplied pressure, if the boring is lined with a steel pipe. This process in accordance with one embodiment of this invention provides a closed-loop geothermal system, thus avoiding any release of pollutants into the atmosphere or biosphere, where the hot and cold water shafts are connected by a closed, pressurized line passing through a heat exchanger. The geothermally heated water is thus directly fed back to the cold water pressure shaft after recovery of the heat energy. It is supplemented by enough water to compensate for system losses and pumped back under a moderate pressure necessary to keep the existing cracks in the reservoir open and to develop new cracks in the existing reservoir area. This ecological aspect is critical for the acceptance of geothermal heat energy recovery: no pollutants are released to the surface, and the dissolved substances are deposited in the cooler, upper cracked regions of the reservoir, as is the case in natural processes. A further important, ecologically positive aspect of the process of this invention is the absence of a cooling tower in the secondary energy system, thereby preventing an additional warming of the atmosphere through release of heat. This is made possible by coupling the facility to an adequate number of users. The users would recover the heat which is carried in the large volume of low-temperature water, and which is usually released into the atmosphere by large conventional and nuclear power plants. The remaining heat content of the returning water from the remote heating system is used in greenhouse and aquaculture installations supplying the population living in the general area of the geothermal power plant.

The geothermal heat energy reservoir provides a great deal of flexibility in that it can act as a heat storage facility for the superheated water, especially when several peripheral return shafts are arranged around the centralized cold water pressure shaft. The shafts filled with superheated water can thus serve as a short-term storage and buffer area, to compensate for daily peaks in energy demand. The entire facility can be used as a long-term buffer, to cover large seasonal variations in energy demand without the need for additional facilities.

The advantages of the hot-weak-rock process are numerous.

1. The heat of the Earth's crust is recoverable at any desired geographical location, not only at a few locations dependent on advantageous geothermal features, as is the case with the Hot-Dry-Rock Process.

2. The hot-weak-rock process allows the recovery of high-grade, process-quality steam energy at volumes per power plant surface area that were heretofore impossible to reach.

3. The risk of the closed reservoirs breaking-through to the surface is minimized by the lining in the borings and by the presence of an extremely strong rock cover over the fractured zone.

4. The quantity as well as the quality of recovered energy actually increases with time for a geothermal energy reservoir developed in this manner. This phenomenon is the result of two factors. The first factor is the tendency of superheated water to flow toward the hottest point according to the laws of viscosity. The initially developed geothermal heat reservoir thus continually expands itself into deeper, hotter zones. The second factor is the constant energy release resulting from thermal stresses, which occurs with the cooling of the geothermal heat reservoir.

I claim:

1. A process for the recovery of geothermal energy and mineral resources in a hot rock in a deep zone of a continental lithosphere lying between 13 and 30 kilometers and in which a shear strength of the hot rock suddenly decreases in relation to an overburden comprising: generating a hydrostatic pressure at a bottom of a water column in a lined boring and supplying an additional pressure with at least one pump at a surface through the lined boring, which said lined boring acts as a cold water pressure shaft, producing a hydraulic fracturing effect to create a plurality of fractured heating zones, returning the supplied water to the surface through at least one recovery shaft located at a distance from the cold water pressure shaft after extracting heat from the hot rock, and recovering at least one of said extracted heat and a mineral fraction in the water.

2. A process according to claim 1, wherein an upper supply end of the cold water pressure shaft and an upper recovery end of the recovery shaft are connected, forming a closed-loop, recirculating geothermal water heating system in which the water is returned to a reservoir after passing through a heat exchanger without contact with a biosphere.

3. A process according to claim 2, wherein an accumulation of a mineral deposit is prevented by an electrical precipitator located in the recirculating geothermal water heating system.

4. A process according to claim 1, wherein a mineral deposit for recovering said mineral resources is effectuated by an electrical precipitator located in a recirculating geothermal water heating system.

5. A process according to claim 4, wherein a developed geothermal heat reservoir is maintained by a pressure pump having an energy consumption that is less than a recovered thermal energy.

6. A process according to claim 5, wherein the developed geothermal heat reservoir continually expands into a deeper, hotter zone using a constant energy release resulting from a thermal stress in a reservoir rock formation and superheated water flowing toward a hottest point according to a law of viscosity, thus increasing a quantity and a quality of energy recovered with increasing operation time.

7. A process according to claim 6, wherein a plurality of borings acting as return shafts for the hot water are arranged in an approximately constant radius about a periphery of the lined boring acting as the cold water pressure shaft, whereby the supplied water gathers heat while flowing radially from the bottom of the central, cold water pressure shaft through at least one crack produced by said hydraulic fracturing effect, thus reaching and finally flowing back up through the return shafts under a resulting pressure.

8. A process according to claim 7, wherein the highly pressurized supplied water, heated through a heat exchanger, drives an expansion turbine coupled to an electric generator or supplies steam for a remote heating system.

9. A process according to claim 8, wherein the process is started by a simultaneous flooding of all borings followed by pressurization of the cold water shaft, combined with an hydraulic fracturing stage, to prevent a formation of a vapor phase with a suspended liquid phase, and to effectuate a single-phase transition to said geothermally superheated water.

10. A process according to claim 9, wherein the shafts filled with said geothermally superheated water serve as a short-term storage and buffer area, to compensate for daily peaks in energy demand, and wherein an entire facility is used as a long-term buffer, to cover large seasonal variations in energy demand without additional facilities.

11. A process according to claim 1, wherein an accumulation of a mineral deposit is prevented by an electrical precipitator located in the recirculating geothermal water heating system.

12. A process according to claim 1, wherein a developed geothermal heat reservoir is maintained by a pressure pump having an energy consumption that is less than a recovered thermal energy.

13. A process according to claim 1, wherein a developed geothermal heat reservoir continually expands into a deeper, hotter zone using a constant energy release resulting from a thermal stress in a reservoir rock formation and superheated water flowing toward a hottest point according to a law of viscosity, thus increasing a quantity and a quality of energy recovered with increasing operation time.

14. A process according to claim 1, wherein a plurality of borings acting as return shafts for the hot water are arranged in an approximately constant radius about a periphery of the lined boring acting as the cold water pressure shaft, whereby the supplied water gathers heat while flowing radially from the bottom of the central, cold water pressure shaft through at least one crack produced by said hydraulic fracturing effect, thus reaching and finally flowing back up through the return shafts under a resulting pressure.

15. A process according to claim 1, wherein the highly pressurized supplied water, heated through a heat exchanger, drives an expansion turbine coupled to an electric generator or supplies steam for a remote heating system.

16. A process according to claim 1, wherein the process is started by a simultaneous flooding of said boring and said at least one recovery shaft followed by pressurization of the cold water shaft, combined with an hydraulic fracturing stage, to prevent a formation of a vapor phase with a suspended liquid phase, and to effectuate a single-phase transition to said geothermally superheated water.

17. A process according to claim 1, wherein said at least one shaft filled with said geothermally superheated water serves as a short-term storage and buffer area, to compensate for daily peaks in energy demand, and wherein an entire facility is used as a long-term buffer, to cover large seasonal variations in energy demand without additional facilities.

* * * * *